Dec. 11, 1962   E. F. MAHON ETAL   3,068,048
ARMREST AND TRAY COMBINATION
Filed May 24, 1961   2 Sheets-Sheet 1

Edward F. Mahon
John C. Blake
INVENTORS

BY *(signatures)*
Attorneys

Dec. 11, 1962  E. F. MAHON ETAL  3,068,048
ARMREST AND TRAY COMBINATION
Filed May 24, 1961  2 Sheets-Sheet 2
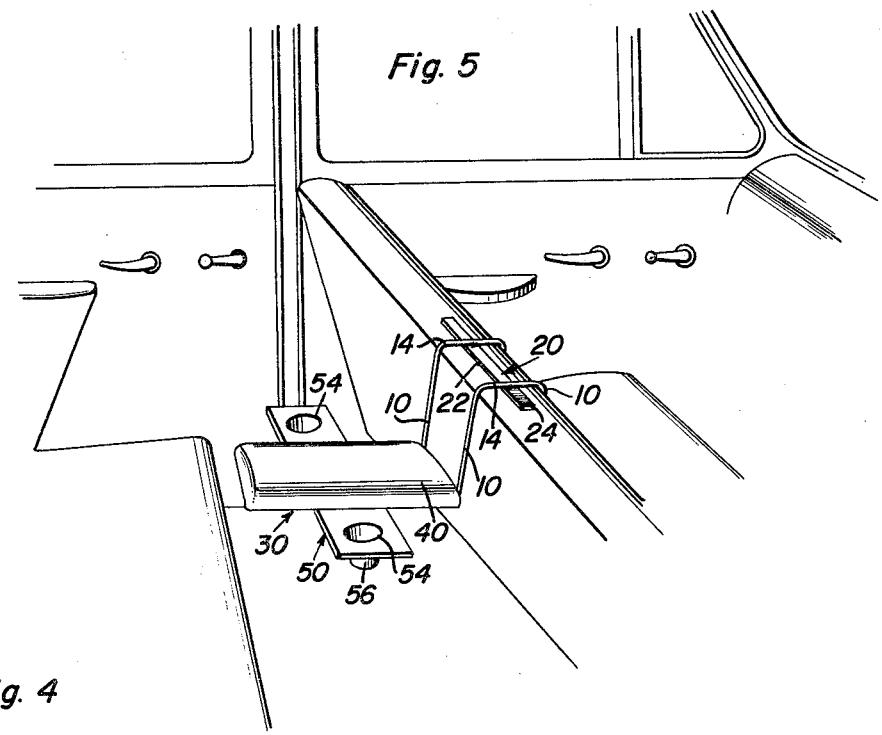
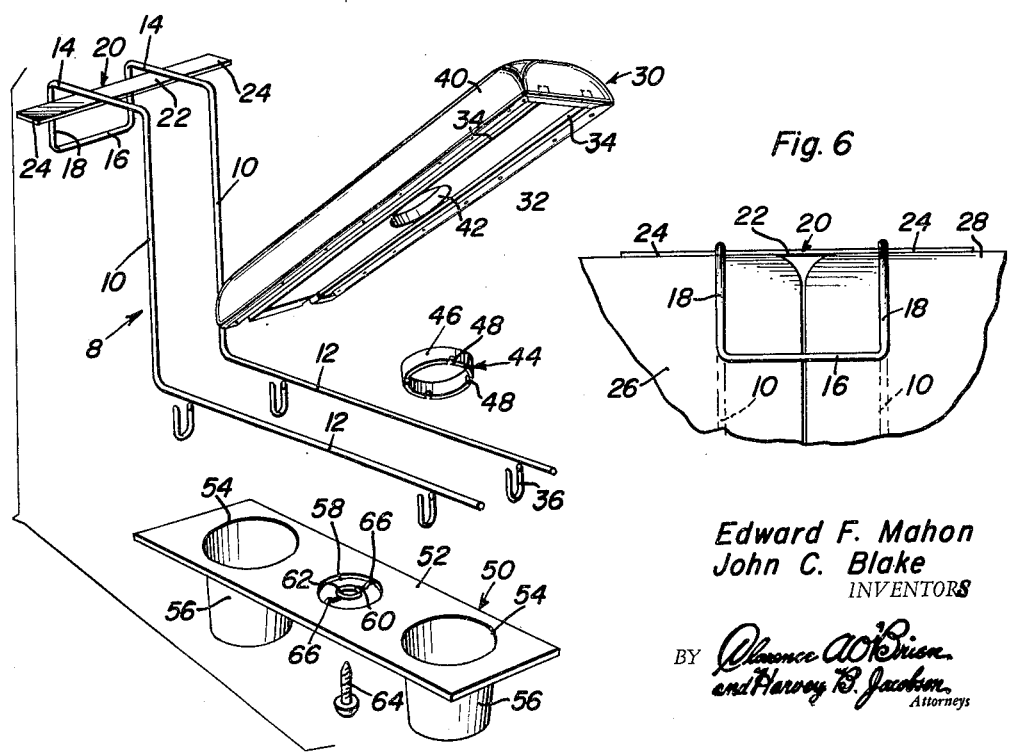
Edward F. Mahon
John C. Blake
INVENTORS United States Patent Office 3,068,048
Patented Dec. 11, 1962

3,068,048
ARMREST AND TRAY COMBINATION
Edward F. Mahon, Arthur Court, and John C. Blake, 10 Miller Road, both of North Branford, Conn.
Filed May 24, 1961, Ser. No. 112,376
4 Claims. (Cl. 297—194)

The present invention relates to armrests which are suitably designed and adapted for use on the interior of an automobile and has to do, more particularly, with an armrest which is characterized by certain new and useful improvements which render it unique and such that it constitutes a novel contribution to the art.

More particularly the instant armrest pertains to the category in this field of endeavor wherein the construction is such that it may be detachably and adjustably mounted on the upper portion of the brackrest of the front seat. Persons conversant with readily applicable and removable armrests are aware that it is common in the art to provide a hanger or a suspension bracket having hook means which may be releasably and adjustably hung on the brackrest of the front seat. For example an early and simple example is that shown in the Decker Patent 1,420,023. A further example, generally analogous to the instant concept would be the Beard armrest in Patent 2,691,408. No effort will be made here to analyze or discuss these reference patents with any degree of particularity because they are merely referred to somewhat in passing to assist in categorizing the improved adaptation herein under advisement. Then, too, it is a common objective to provide a compact and convenient detachable armrest for relief of driving fatigue and which may be swiched from left to right and thus placed at either end of the brackrest of the front seat or at the center thereof whereby to provide an armrest which will afford comfort to the right arm of the driver thus expediting driving over an extended period of time.

Somewhat more explicity the present invention pertains to an advanced design in construction which despite the fact that it embodies added features is nevertheless simple, practical, convenient and economical and such that it ought to be endorsed by manufacturers and retailers in that it will better serve the needs of not only the driver but other occupants of the car too.

In carrying out a preferred embodiment of the invention several improvements have been adopted. One improvement has to do with the readily applicable and removable hanger suspension bracket which is of onepiece construction, is of properly designed construction, embodies a stabilizing bar and is adaptable to use on a onepiece backrest or where separate seats with separate backrests are embodied in the automobile.

The invention also features a cushion embodying a rigid wooden or an equivalent panel which is grooved so that it can be readily attached to and supported on intended arms or the noval hanger bracket.

Further novelty is predicated on a highly significant improvement; namely, a so-called tray which is normally concealed beneath and in an out-of-the-way position in relation to the cushion but is capable of being pivoted and swung to a position wherein it will serve as efficient support means for beverages, soft drinks, milkshakes and the like. Further and in connection with this aspect of the concept it may be stated that simple latching and retaining means is provided to hold the tray in either open or closed position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of an exploded type wherein all of the essential component parts are disclosed in easy-to-see relationship;

FIGURE 5 is a view similar to FIGURE 4 in perspective and fragmentarily shown but illustrating how the invention may be reversed and used by occupants of the rear or back seat in an automobile; and FIGURE 6 is a fragmentary view with only portions of the hanger or suspension bracket appearing, the purpose of the view being to show how the bracket serves satisfactorily on a splie backrest, that is, where separate seats or a divided backrest are being served.

Figure 1:
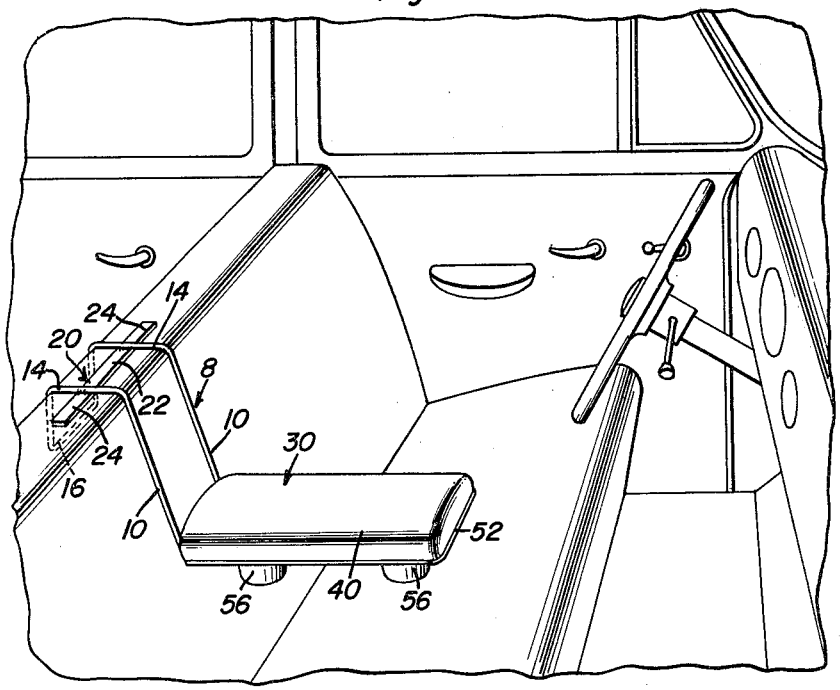
FIGURE 1 is a fragmentary view showing a portion of an automobile, the front seat and its backrest and the improved armrest in a central position to accommodate the right arm and hand of the driver or the left arm and hand of the front seat occupant.
Figure 2:
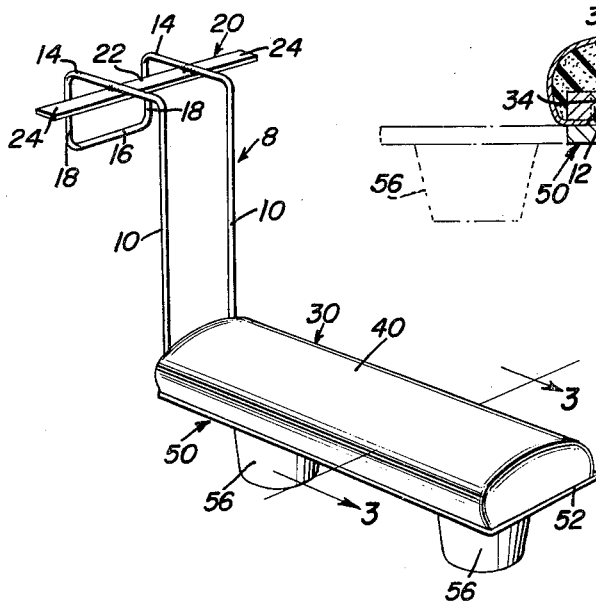
FIGURE 2 is a view in perspective of the invention by itself.

By way of explanation and concering FIGURES 1 and 5, respectively, it will be understood that the invention is an innovation in this respect in that it lends itself to practical and efficient use whether applied an shown in FIG. 1 and extending forwardly in relation to the front seat or applied to extend rearwardly from the backrest of the front seat as depicted in FIG. 5. The construction of the overall device is the same. Starting with the hanger or suspension bracket this component is denoted generally by the numeral 8 and it is constructed from sturdy rod stock, in fact from a single length of rod which is bent upon itself in between its ends to provide a pair of duplicate components; namely, a pair of vertical depending limbs 10, horizontal spaced parallel extensions 12. The upper ends of the limbs are provided with rearwardly projecting (projecting to the left in FIG. 4) short horizontal extensions 14 which are connected to a downbent portion of U-shaped form having a bight portion 16 and companion side members 18. These parts 14, 16 and 18 go to make up a satisfactory hook which may be releasably hung over the upper edge portion of the backrest in the manner illustrated in FIGS. 1 and 5. Attention is directed at this time to a stabilizing member 20 which comprises a flat bar or strip of metal having a median portion 22 joined with the extensions 14 and welded or otherwise held in place and with projecting terminal end portions 24 which project in the manner illustrated in FIGS. 1 and 5 for example to stabilize the bracket 8. Also with this construction and by reason of the included bar or stabilizer 20 the hanger bracket with its hook means may be employed on split backrest sections or separate portions of which are denoted conveniently at 26 and 28 in FIG. 6.

With reference now to the second principal unit or component part this comprises the aforementioned cushion and is denoted generally by the numeral 30. It comprises an elongated wooden base or panel 32 (see FIG. 3) which is provided in its bottom with a pair of open ended channels or grooves 34 which provide keyways for the keying extensions or members 12. Simple U-shaped staples or equivalent fasteners 36 are driven into the panel and embrace the extensions to thus join the panel 32 to the extensions. The panel is provided with suitable cushioning material 38 and an appropriate casing or jacket 40. This part 40 may be made of colorful plastic material which will harmonize with the seat covers. The central or median underneath portion of the panel is provided with a recess 42 and a ring or collar 44 is suitably and telescopically fitted into the recess and adhesively or otherwise retained in place (not detailed). The ring or collar is specifically denoted by the numeral 46 and the lower edge thereof is provided with circumferentially spaced keeper notches or seats 48.

Figure 3:
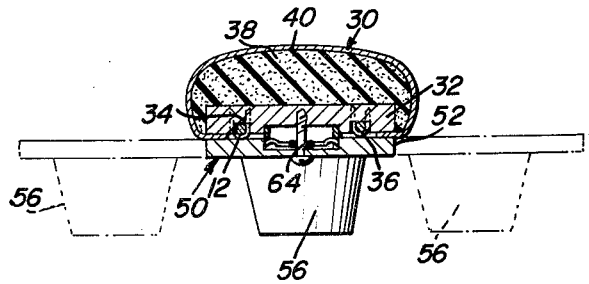
FIGURE 3 is a cross-section on a slightly enlarged scale taken on the plane of the line 3—3 of FIGURE 2 looking in the direction of the arrows and showing the projectible and retractible tray in full and dotted lines respectively.

Attention is now directed to the foldable or projectible and retractible tray 50. This part comprises a relatively movable plate or panel 52 which may be made of plastic or a suitable material and which is rectangular and corresponds in a real size to the underneath side of the cushion. This plate is provided at its ends with openings 54 to accommodate aligned depending receptacles or cups 56 which may be used as receivers for drinking glasses, cups, bottles, and so on. In other words when the user of this unique armrest is stopping over temporarily at a drive-in restaurant or an equivalent eating place the tray will be at his disposal and he can swing it out as shown in dotted lines and place a glass of milk, juice, or a soft drink bottle or whatever is necessary in one of the receivers. In practice it is believed that it will be desirable to have some suitable latch means to hold the tray in its open and closed positions so that it will not be too easily displaced. To this end the upper median portion of the plate is provided with a well or recess 58 having catch means therein. The catch comprises a simple spider 60 with a central eye 62 to permit passage therethrough of a cooperating portion of the tray attaching and swiveling screw or fastener 64 (FIG. 3). The resilient or springy detents 66 serve to support and swively mount the tray so that it can be opened and closed at will.

As already pointed out the device can be used atop the backrest and shifted from one end to the other or placed in the middle and allowed to project forwardly or it may be reversed to project rearwardly as brought out in FIG. 5. These two illustrations tend to reveal the versatility of the invention. But more important the particular construction depicted in FIG. 4 and the improved features and results are outstanding. In construction the armrest is of simple sturdy design which can be installed on most models of present day automobiles. It is characterized by the onepiece novel wire bracket or hanger with hook means and there are no parts or separate pieces to be fitted or adjusted. Prior art devices of the attached or hung-on type are often complicated and may be made up of components which are likely because of relative movement to get out of order. The armrest and tray constitute a single assemblage or unit. No storage problems involving the tray are necessary to cope with. Starting from its concealed position the tray will rotate 90 degrees in either direction. This puts the tray in a satisfactory usable position. Again by turning the tray 90 degrees in the other direction the tray is returned to its concealed position. There are no difficult clamps to contend with and because the device is readily applicable and removable it can be readily detached in case of an emergency. There are no projecting parts or sharp edges which might prove harmful to any of the occupants of the vehicle or which might rip or tear the upholstery.

It is believed that a careful consideration of the stated objectives, the description of the details, the invention as claimed all considered collectively and in conjunction with the overall drawings will enable the reader to obtain a clear understanding of the subject matter of the invention and its featured advantages and mode of use. Therefore, a more lengthy description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. As a component of an armrest construction of the class described, a hanger and an attaching bracket comprising a single piece rod member bent upon itself between its ends and providing a pair of spaced coplanar arms provided at lower ends with a pair of lateral outstanding extensions, said arms having upper end portions connected with shorter extensions, said shorter extensions being connected to side portions of a depending hook, a stabilizing bar having a median portion connected to the short extensions and having end portions projecting therebeyond to balance and support the hook once it is applied, and a readily attachable and detachable cushion having a panel at the bottom thereof, said panel having grooves in the underside thereof and said outstanding extensions fitting removably into their respective grooves.

2. In combination, a cushioned armrest, bracket means for mounting the armrest laterally to and on a backrest of a seat construction, and an article holding tray pivotally mounted beneath and normally concealed beneath the armrest, and comprising a swively mounted panel having selectively usable end portions, said end portions being provided with receivers capable of receiving and holding a glass of milk, a soft drink bottle, a milkshake in a container or the like, said armrest having a bottom panel providing a base, the latter having a recess in its underneath side, a collar fitted into said recess and secured in place, said collar having a lower edge provided with circumferentially spaced keeper notches, said tray-panel being provided with a centrally disposed pivoting bolt secured to the recessed portion of the base-panel and said bolt being provided with cooperating resilient detents, said detents being releasably engageable with keeper notches provided therefor in said collar.

3. In combination, a vehicle having a seat construction including a backrest, a hanger bracket having a pair of spaced parallel depending arms adapted to reside in contact with adjacent cooperating surfaces of the backrest, upper end portions of said arms being provided with a hook which is releasably engageable over an upper edge portion of the backrest, said arms being provided at lower end portions thereof with coplanar spaced parallel right angularly disposed independent extensions, a cushion having a bottom panel providing a base, said panel having a flat underneath side provided with spaced parallel open ended grooves, said extensions being fitted removably and retained in their respective grooves, a stabilizing bar having portions thereof joined to component portions of said hook and having end portions projecting outwardly beyond the adjacent portions of the hook, said bar being of a size relative to the hook and cooperating in conjunction with the hook to facilitate reliable retention of the bracket on the backrest when the bracket is being used.

4. In combination, a cushioned armrest, bracket means for mounting the armrest on the backrest of a vehicle seat construction with said armrest projecting in a horizontal plane lateral to a cooperating vertical surface of the backrest, said armrest having a flat-bottom panel providing a base, an article holding tray embodying a panel which is substantially flat and is normally in contact with the underneath side of said base and is commensurate in length and width with the length and width of said base and normally underlies the base and is concealed from view by the base, accessible means pivotally connecting a median portion of said tray-panel with said base, means for positively retaining the tray panel in its normal position directly concealed beneath and covered by said base and alternatively in a position at right angles to the lengthwise dimension of the base with its end portions projecting beyond edge portions of said base, said tray panel having end portions thereof provided with upwardly opening receivers capable of receiving and holding a glass of milk, a soft drink bottle, milkshake in a container or the like, said base providing closure means for said receivers.

References Cited in the file of this patent

UNITED STATES PATENTS

| | | |
|---|---|---|
| D. 110,805 | Fall | Aug. 9, 1938 |
| 1,161,691 | Klemm et al. | Nov. 23, 1915 |
| 1,301,913 | Corby | Apr. 29, 1919 |
| 2,642,926 | Diamond | June 23, 1953 |
| 2,691,408 | Beard | Oct. 12, 1954 |
| 2,704,114 | Williams | Mar. 15, 1955 |
| 2,725,928 | Branick | Dec. 6, 1955 |
| 2,797,739 | Orsini | July 2, 1957 |
| 2,825,611 | Aynesworth | Mar. 4, 1958 |